United States Patent [19]

Poulgouras

[11] Patent Number: 4,954,357
[45] Date of Patent: Sep. 4, 1990

[54] METHOD OF MAKING PIZZA DOUGH

[76] Inventor: Konstantinos Poulgouras, Box 1975, Tisdale, Saskatchewan, Canada, S0E 1T0

[21] Appl. No.: 346,931

[22] Filed: May 3, 1989

[30] Foreign Application Priority Data

Aug. 3, 1988 [CA] Canada ................................ 573700

[51] Int. Cl.$^5$ .............................................. A21D 8/00
[52] U.S. Cl. ...................................... 426/302; 426/19; 426/94; 426/549
[58] Field of Search ................... 426/549, 94, 19, 302

[56] References Cited

U.S. PATENT DOCUMENTS

| 952,114 | 3/1910 | Heinzer | 426/19 |
|---|---|---|---|
| 1,968,916 | 8/1934 | Siegel | 426/19 |
| 3,594,181 | 7/1971 | Alpin | 426/19 |
| 4,020,184 | 4/1977 | Chesner | 426/302 |
| 4,514,430 | 4/1985 | Hartman . | |

FOREIGN PATENT DOCUMENTS

| 345186 | 10/1934 | Canada . | |
|---|---|---|---|
| 695273 | 9/1964 | Canada . | |
| 777083 | 1/1968 | Canada . | |
| 1000998 | 12/1976 | Canada . | |
| 1002380 | 12/1976 | Canada . | |
| 1147322 | 3/1985 | U.S.S.R. | 426/19 |

OTHER PUBLICATIONS

De Gouy, The Bread Tray, Greenburg publisher, New York, 1944, p. 72.

Primary Examiner—Donald E. Czaja
Assistant Examiner—Mary S. Mims
Attorney, Agent, or Firm—Wenderoth, Lind & Ponack

[57] ABSTRACT

There is described an improved method of making pizza dough in which flavor material is added to the dough prior to cooking it. The flavor material could be of any suitable form such as anise, basil, mint or any herb, fruit, spice, artifical or natural flavoring. An improved dough and an improved pizza crust permeated by the required flavor is obtained.

7 Claims, No Drawings

METHOD OF MAKING PIZZA DOUGH

The present invention relates to pizza doughs and pizzas and particularly to the preparation thereof.

BACKGROUOND OF THE INVENTION

In the normal preparation of pizzas a plain bread-like dough is prepared to which the ingredients forming the pizza filling are added immediately prior to cooking. After cooking the taste of the pizza is obtained from the fillings cooked with the pizza dough, the pizza dough itself maintaining a bread-like taste and texture.

SUMMARY OF THE INVENTION

It is an object of the present invention to provide an improved pizza dough culminating in an improved pizza shell or crust.

According to the present invention, in the preparation of a pizza dough a flavour material is added to the dough whilst it is being made and prior to its cooking.

The flavour material can be any required herb, fruit, spice, artificial and/or natural flavouring preferably selected either singly or in combination from the group hereunder:

- Anise
- Basil
- Mint
- Marjoram
- Thyme
- Cinnamon
- Almond
- Coconut
- Pineapple
- Orange
- Strawberries
- Raspberries
- Cloves
- Lemon
- Peach The present invention also provides a pizza dough to which flavour material has been added prior to cooking of the dough.

Additionally the invention provides an improved pizza crust or shell to which flavour material has been added prior to cooking so that the flavour permeates cooked crust.

DESCRIPTION OF PREFERRED EMBODIMENTS

There will now be described, by way of example the preparation of a pizza dough and shell or crust, having an anise flavour.

Two ounces of flavour material, in this case anise, are crushed and placed into water at luke warm temperature so that the water absorbs the taste of the anise and this makes an anise concoction. Then to a mixture of a small teaspoon of yeast (Fleischmanns), two tablespoons of sugar, one big teaspoon of salt and one half tablespoon of succarol is added less than a half gallon of the concoction of water and anise. Two to three teaspoons of baking powder and one half cup of vegetable oil are mixed with the other ingredients and the whole is put into the tub of a mixing machine. Seven pounds of flour (Robin Hood, trade mark) is added to the mixing machine an everything is mixed together with the machine in first gear, stirring for seven to ten minutes.

This produces a ten pound mixture which will make fourteen to seventeen large pizzas. Canola oil should be poured on top of the mixture to keep it moist.

The mixture is then cut up and rolled into small balls which are put into pans of about twelve inches diameter. The dough in the pans is wrapped in plastic and left to stand for some forty-five minutes at a room temperature of about 80 degrees Fahrenheit.

Thereafter the dough is stretched out on the pan and pressed out into the periphery thereof. The pizza filling ingredients are then added to the stretched dough and the pans are put in an oven at 650° F. for six to seven minutes.

The improved pizza appears as an ordinary pizza and the shell and crust behaves in the fashion of an ordinary shell and crust with a similar texture and colour. However, the crust and shell no longer have a straightforward bread-like taste and is permeated by the anise to produce the desired flavour.

Although the example given above has been for an anise flavour other flavours could be used, for example basil, mint or any herb, fruit, spice or artificial or natural flavouring could be substituted for anise. A list of suitable flavours is set out hereunder:

- Anise
- Basil
- Mint
- Marjoram
- Thyme
- Cinnamon
- Almond
- Coconut
- Pineapple
- Orange
- Strawberries
- Raspberries
- Cloves
- Lemon
- Peach The introduction of flavour material into the pizza dough prior to cooking, as against obtaining flavour for the pizza by application of sauces and fillings, provides the advantage that the taste and smell, after cooking is near identical to the original ingredient smell and taste prior to mixing it.

What is claimed is:

1. In the preparation of a pizza dough the improvement comprising flavoring said dough by the steps of:
   (1) preparing a concoction by placing a flavour material in warm water until the water absorbs the taste of said material;
   (2) assembling the ingredients of a pizza dough and adding the concocted liquid thereto;
   (3) mixing the ingredients and concocted liquid in a mixing machine to produce a dough mixture; and
   (4) pouring oil over said dough mixture to keep it moist.

2. In the preparation of a pizza shell or crust the improvement comprising flavoring said shell or crust by the steps of:
   (1) preparing a concoction by placing a flavour material in warm water until the water absorbs the taste of said material;
   (2) assembling the ingredients of a pizza dough and adding the concocted liquid thereto;
   (3) mixing the ingredients and concocted liquid in a mixing machine to produce a dough mixture;

(4) pouring oil over said dough mixture to keep it moist; and (5) allowing the dough to rise, shaping the dough and baking the risen and shaped dough in an oven at high temperature.

3. In the preparation of a pizza dough the improvement comprisisng flavoring the said dough by the steps of:
  (1) preparing a concoction by placing a crushed flavor material in warm water until the water absorbs the taste of said material;
  (2) assembling the ingredients of a pizza dough and adding the concocted liquid thereto;
  (3) mixing the ingredients and concocted liquid in a mixing machine to produce a dough mixture; and
  (4) pouring oil over said dough mixture to keep it moist.

4. The improvement as claimed in claim 7 wherein the flavour material is a material selected from the group consisting of anise, bail, mint, marjoram, thyme, cinnamon, cloves, lemon, almond, coconut, pineapple, orange, strawberries, raspberries, peach and mixtures thereof.

5. In the preparation of a pizza shell or crust the improvement comprising flavoring said shell or crust by the steps of:
  (1) preparing a concoction by placing a crushed flavour material in warm water until the water absorbs the taste of said material;
  (2) assembling the ingredients of a pizza dough and adding the concocted liquid thereto;
  (3) mixing the ingredients and concocted liquid in a mixing machine to produce a dough mixture;
  (4) pouring oil over said dough mixture to keep it moist; and
  (5) allowing the dough to rise, shaping the dough and baking the risen and shaped dough in an oven at high temperature.

6. The improvement as claimed in claim 5 wherein the baking step is conducted at a heat of about 650° F. for six to seven minutes.

7. The improvement as claimed in claim 5 wherein the flavour material is a material selected from the group consisting of anise, basil, mint, marjoram, thyme, cinnamon, cloves, lemon, almond, coconut, pineapple, orange, strawberries, raspberries, peach and mixtures thereof.

* * * * *